US009548076B2

(12) United States Patent
Huang et al.

(10) Patent No.: US 9,548,076 B2
(45) Date of Patent: *Jan. 17, 2017

(54) MAGNETIC DEVICES WITH OVERCOATS

(71) Applicant: SEAGATE TECHNOLOGY LLC, Cupertino, CA (US)

(72) Inventors: Xiaoyue Huang, Eden Prairie, MN (US); Seung-Yeul Yang, Eden Prairie, MN (US); Steve Riemer, Minneapolis, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,455

(22) Filed: Nov. 3, 2014

(65) Prior Publication Data
US 2015/0131416 A1 May 14, 2015

Related U.S. Application Data

(60) Provisional application No. 61/901,615, filed on Nov. 8, 2013.

(51) Int. Cl.

| | |
|---|---|
| *G11B 7/1387* | (2012.01) |
| *C04B 35/505* | (2006.01) |
| *G11B 5/127* | (2006.01) |
| *G11B 7/24053* | (2013.01) |
| *G11B 5/10* | (2006.01) |
| *G11B 5/187* | (2006.01) |

(Continued)

(52) U.S. Cl.
CPC .............. *G11B 7/1387* (2013.01); *G11B 5/10* (2013.01); *G11B 5/127* (2013.01); *G11B 5/187* (2013.01); *G11B 5/3106* (2013.01); *G11B 7/24053* (2013.01); *G11B 2005/0021* (2013.01)

(58) Field of Classification Search
CPC . G11B 7/1384; G11B 7/24059; G11B 7/2403; G11B 7/24047; G11B 7/1387; G11B 9/12; G11B 11/24; G11B 13/08; G11B 2005/0021; G11B 5/10; G11B 5/187; G11B 5/3106; G11B 5/127; G11B 5/1272; G11B 7/24053
See application file for complete search history.

(56) References Cited

U.S. PATENT DOCUMENTS

| | | | | |
|---|---|---|---|---|
| 5,897,931 | A | * | 4/1999 | Ahlert ..................... G11B 5/72 360/135 |
| 7,782,569 | B2 | | 8/2010 | Cheng |
| 8,009,387 | B2 | | 8/2011 | Cheng |

(Continued)

FOREIGN PATENT DOCUMENTS

| | | |
|---|---|---|
| JP | 2012-212495 | 11/2012 |
| KR | 10-2008-0068583 | 7/2008 |

OTHER PUBLICATIONS

U.S. Appl. No. 14/313,611, filed Jun. 24, 2014, Cheng.

*Primary Examiner* — Dionne H Pendleton
(74) *Attorney, Agent, or Firm* — Mueting, Raasch & Gebhardt, P.A.

(57) ABSTRACT

A magnetic device including a magnetic writer; and an overcoat positioned over at least the magnetic writer, the overcoat including oxides of yttrium, oxides of scandium, oxides of lanthanoids, oxides of actionoids, oxides of zinc, or combinations thereof.

20 Claims, 3 Drawing Sheets

(51) Int. Cl.
*G11B 5/31* (2006.01)
*G11B 5/00* (2006.01)

(56) References Cited

U.S. PATENT DOCUMENTS

| | | | |
|---|---|---|---|
| 8,018,682 B2 | 9/2011 | Cheng | |
| 8,976,634 B2 * | 3/2015 | Cheng | G11B 5/3106 369/13.13 |
| 2007/0177302 A1 * | 8/2007 | Shimazawa | G11B 5/314 360/125.33 |
| 2012/0026846 A1 * | 2/2012 | Komura | G11B 5/314 369/13.33 |
| 2014/0153136 A1 * | 6/2014 | Flint | G11B 5/10 360/235.1 |
| 2014/0376348 A1 * | 12/2014 | Cheng | G11B 5/3106 369/13.33 |
| 2015/0063086 A1 * | 3/2015 | Wierman | G11B 5/40 369/13.33 |
| 2015/0287425 A1 * | 10/2015 | Guler | G11B 5/3116 369/13.33 |

\* cited by examiner

MAGNETIC DEVICES WITH OVERCOATS

CROSS REFERENCE TO RELATED APPLICATION

This application claims priority to U.S. Provisional Application No. 61/901,615 entitled, DEVICES INCLUDING NEAR FIELD TRANSDUCERS AND ASSOCIATED OVERCOATS, filed on Nov. 8, 2013, the disclosure of which is incorporated herein by reference thereto.

BACKGROUND

The heat assisted magnetic recording (HAMR) process can involve an environment that can be extremely corrosive because of the high temperature (e.g., up to about 450° C.), high humidity, and oxidative environments. Because of the harsh environment and the desire to protect some of the more delicate structures, for example the near field transducer (NFT) and the write pole for example; there remains a need for different types of overcoats.

SUMMARY

A magnetic device including a magnetic writer; and an overcoat positioned over at least the magnetic writer, the overcoat including oxides of yttrium, oxides of scandium, oxides of lanthanoids, oxides of actionoids, oxides of zinc, or combinations thereof.

Also disclosed are magnetic devices that include a near field transducer (NFT); and an overcoat positioned over at least a portion of the NFT, the overcoat including an inner layer in contact with the NFT, the inner layer including oxides of yttrium, oxides of scandium, oxides of lanthanoids, oxides of actionoids, oxides of zinc, or combinations thereof; and an outer layer in contact with the inner layer, the outer layer comprising aluminum oxide ($Al_2O_3$), silicon oxide ($SiO_2$), tantalum oxide ($Ta_2O_5$), hafnium oxide ($HfO_2$), or combinations thereof.

Also disclosed are magnetic devices that include a near field transducer (NFT); and an overcoat positioned over at least a portion of the NFT, the overcoat including an inner layer in contact with the NFT, the inner layer including oxides of yttrium, oxides of scandium, oxides of lanthanoids, oxides of actionoids, oxides of zinc, or combinations thereof; and an outer layer in contact with the inner layer, the outer layer including aluminum oxide ($Al_2O_3$), silicon oxide ($SiO_2$), tantalum oxide ($Ta_2O_5$), hafnium oxide ($HfO_2$), or combinations thereof.

Also disclosed are magnetic devices that include a magnetic writer, the magnetic writer having a near field transducer (NFT); a magnetic reader; and an overcoat positioned over at least the magnetic writer and the magnetic reader, the overcoat including an inner layer in contact with the NFT, the inner layer including yttrium, oxide, scandium, oxide, or combinations thereof; and an outer layer in contact with the inner layer, the outer layer including aluminum oxide ($Al_2O_3$), silicon oxide ($SiO_2$), tantalum oxide ($Ta_2O_5$), hafnium oxide ($HfO_2$), or combinations thereof.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a near field transducer (NFT) is utilized. During a magnetic recording operation, the NFT absorbs energy from a laser and focuses it to a very small area; this can cause the temperature of the NFT to increase. The temperature of the NFT can be elevated up to about 400° C. or more.

Because of the elevated temperature and harsh environment, layers over the magnetic head, referred to herein as overcoats can be important. In some embodiments, overcoats can provide Disclosed overcoats can advantageously provide devices that may be more robust in high temperature environments, such as HAMR. Disclosed overcoats include at least oxides of yttrium, oxides of scandium, oxides of lanthanoids, oxides of actionoids, oxides of zinc, or combinations thereof.

Figure 1:
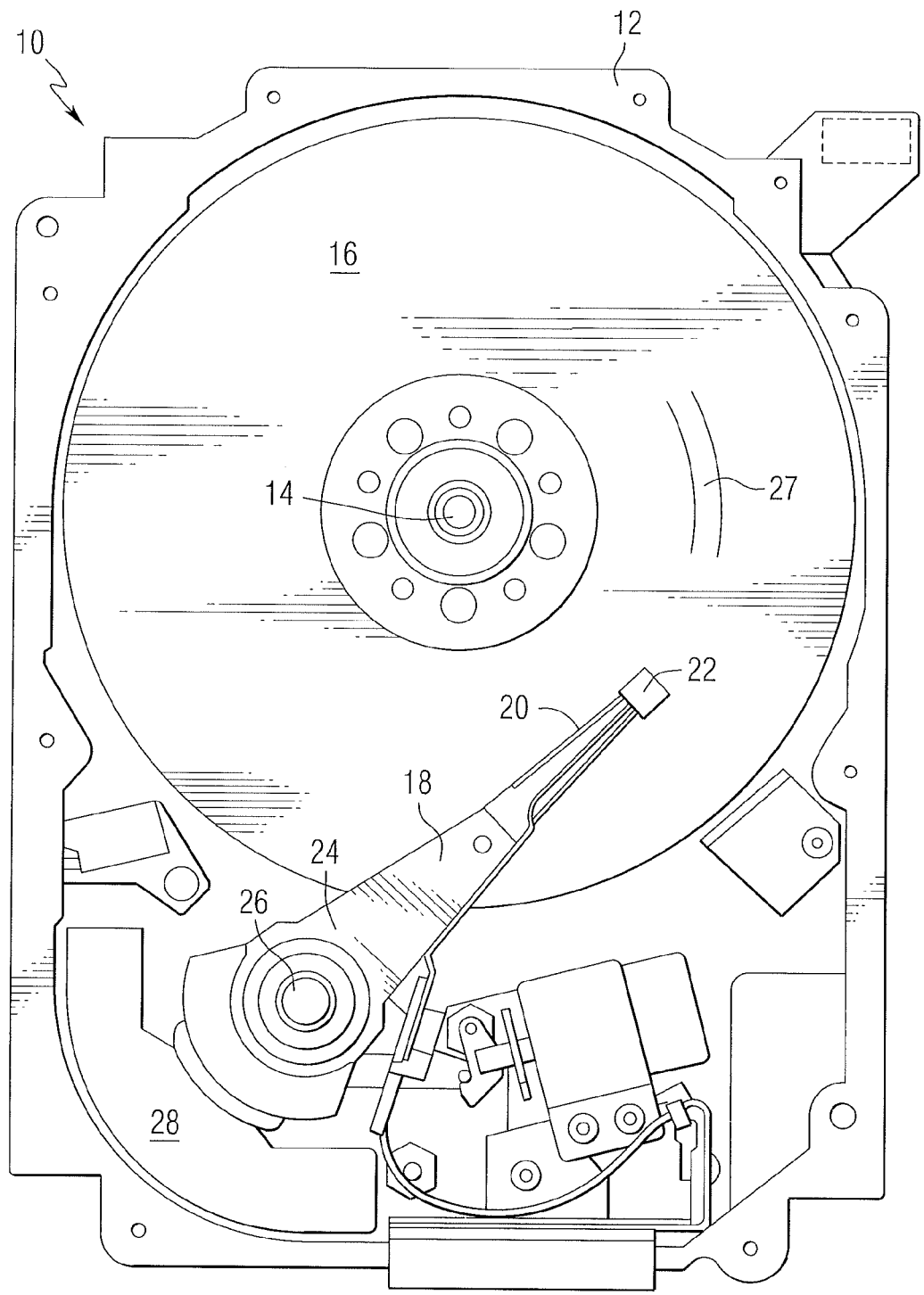
FIG. 1 is a pictorial representation of a data storage device in the form of a disc drive that can include a recording head constructed in accordance with an aspect of this disclosure.

Disclosed herein are NFTs and devices that include such NFTs. FIG. 1 is a pictorial representation of a data storage device in the form of a disc drive 10 that can utilize disclosed NFTs. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. While FIG. 1 shows a disc drive, disclosed NFTs can be utilized in other devices that include a near field transducer.

Figure 2:
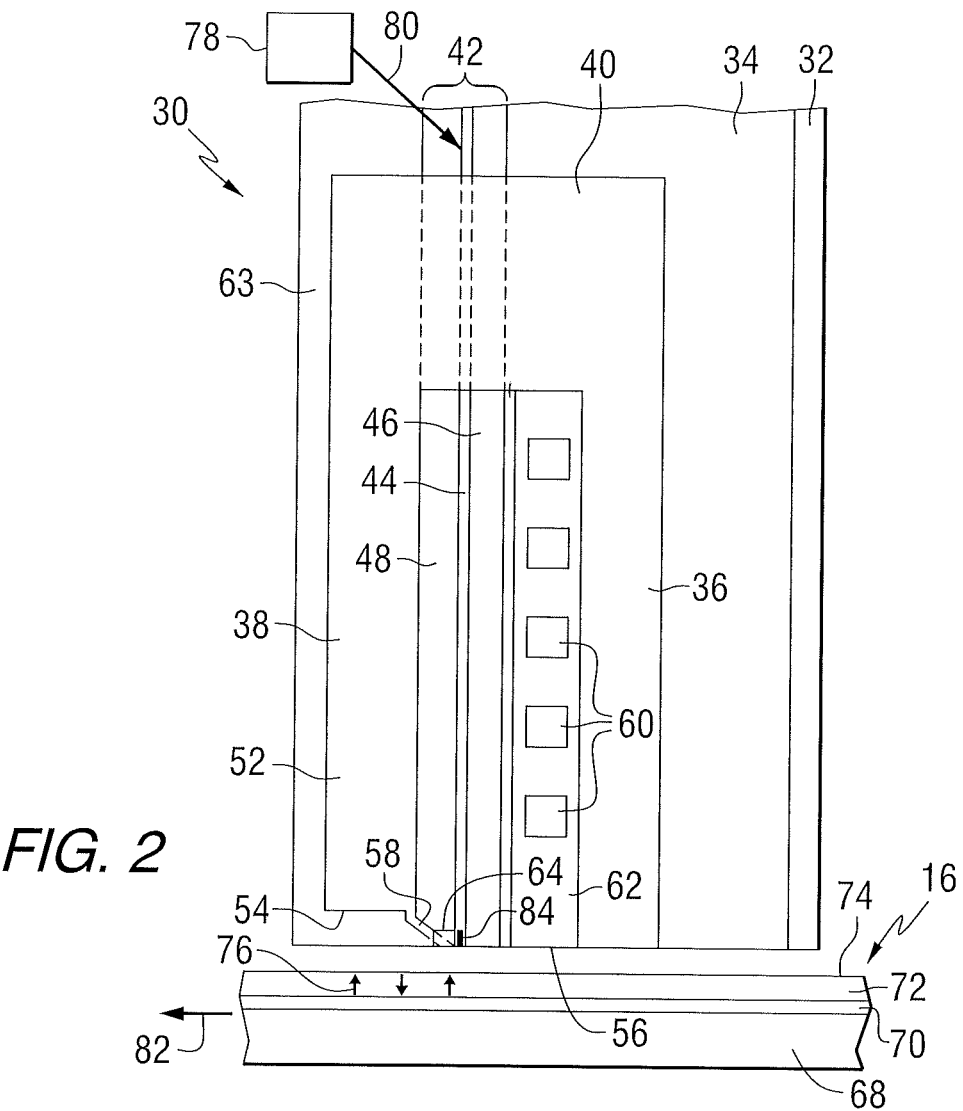
FIG. 2 is a side elevation view of a recording head constructed in accordance with an aspect of the invention.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. The top pole is a two-piece pole that includes a first portion, or pole body 52, having a first end 54 that is spaced from the air bearing surface 56, and a second portion, or sloped pole piece 58, extending from the first portion and tilted in a direction toward the NFT. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light is focused on the NFT and the energy is transferred from the light to the NFT and subsequently to the media and heats a portion of the media, as the media moves relative to the recording head as shown by arrow 82. A near-field transducer (NFT) 84 is positioned in or adjacent to the waveguide and at or near the air bearing surface. The design may incorporate a heat sink made of a thermally conductive material integral to, or in direct contact with, the NFT 84, and chosen such that it does not prevent coupling of electromagnetic energy into and out of the NFT 84. The heat sink may be composed of a single structure or multiple connected structures, positioned such that they can transfer heat to other metallic features in the head and/or to the gas flow external to the recording head.

Although the example of FIG. 2 shows a perpendicular magnetic recording head and a perpendicular magnetic storage media, it will be appreciated that the disclosure may also be used in conjunction with other types of recording heads and/or storage media as well. It should also be noted that disclosed devices can also be utilized with magnetic recording devices other than HAMR devices.

Figure 3A:
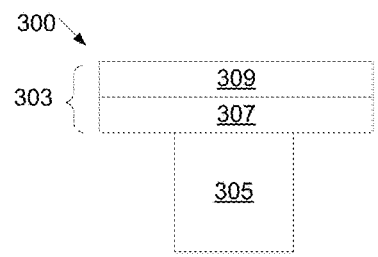
FIGS. 3A, 3B, and 3C are schematic depictions of cross sections of portions of a device (FIGS. 3A and 3B) and a view from the air bearing surface (ABS) of a device (FIG. 3C).

FIG. 3A depicts a device 300 that includes a NFT 305. The NFT 305 can include features and characteristics such as those discussed above. The device 300 also includes an overcoat 303. The overcoat 303 depicted in FIG. 3A includes an inner layer 307 and an outer layer 309. The inner layer 307 may function to provide increased adhesion to the NFT 305. The outer layer 309 may function to diminish or prevent the amount of gas that can reach the NFT 305.

The inner layer 307 may include one or more than one material, one or more than one sublayer, or combinations thereof. The inner layer 307 may include oxides of yttrium, oxides of scandium, oxides of lanthanoids (or lanthanides), oxides of actionoids (or actinides), oxides of zinc, or combinations thereof. More specifically, the inner layer 307 may include yttrium oxide ($Y_2O_3$), scandium oxide ($Sc_2O_3$), oxides of lanthanoids: lanthanum oxide ($La_2O_3$), cerium oxide ($Ce_2O_3$, or $CeO_2$), praseodymium oxide ($Pr_2O_3$), neodymium oxide ($Nd_2O_3$), promethium oxide ($Pm_2O_3$), samarium oxide ($Sm_2O_3$), europium oxide ($Eu_2O_3$), gadolinium oxide ($Gd_2O_3$), terbium oxide ($Tb_4O_7$, $Tb_2O_3$, $TbO_2$, or $Tb_6O_{11}$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and lutetium oxide ($Lu_2O_3$), oxides of actinoids: actinium oxide ($Ac_2O_3$), thorium oxide ($Th_2O_7$ or $ThO_2$), protactinium oxide ($Pa_2O_5$, $PaO_2$, or $PaO$), uranium oxide ($U_3O_8$, $UO_2$, $UO_3$, $U_2O_5$, or $UO_4.2H_2O$), neptunium oxide ($NpO_2$, $Np_2O_5$, or $Np_5O_8$), plutonium oxide ($PuO_2$ or $PuO_4$), americium oxide (AmO, $Am_2O_3$, or $AmO_2$), curium oxide ($Cm_2O_3$, $CmO_2$, or $CmO_4$), berkelium oxide ($Bk_2O_3$, or $BkO_2$), californium oxide ($Cf_2O_3$ or $CfO_2$), einsteinium oxide ($Es_2O_3$), fermium oxide ($Fm_2O_3$, or FmO), mendelevium oxide ($Md_2O_3$ or MdO), nobelium oxide ($No_2O_3$ or NoO), and lawrencium oxide ($Lr_2O_3$), zinc oxide (ZnO), or combinations thereof. In some embodiments, the inner layer 307 includes yttrium oxide or scandium oxide. In some embodiments, the inner layer 307 includes yttrium oxide.

The outer layer 309 may include one or more than one material, one or more than one sublayer, or combinations thereof. The outer layer 309 may include any material that has relatively low gas permeability. In some embodiments, the outer layer 309 may include aluminum oxide ($Al_2O_3$), silicon oxide ($SiO_2$), tantalum oxide ($Ta_2O_5$), hafnium oxide ($HfO_2$), or combinations thereof. In some embodiments, the outer layer 309 is made up of more than one material. In some embodiments, the outer layer 309 is made up of more than one layer. In some embodiments, the outer layer 309 is made up of more than one layer of at least two different materials. In some embodiments, the outer layer 309 includes a first layer in contact with the inner layer 307 and a second layer in contact with the first layer. In some embodiments, the second layer includes $SiO_2$, $Ta_2O_5$, $HfO_2$, or combinations thereof as they have a relatively high resistance to hydrothermal corrosion. In some embodiments, the first layer includes $Al_2O_3$. In some embodiments, the outer layer 309 has a first layer that includes $Al_2O_3$ and a second layer that includes $SiO_2$, $Ta_2O_5$, $HfO_2$, or combinations thereof. In some embodiments, the outer layer 309 has a first layer that includes $Al_2O_3$ and a second layer that includes $SiO_2$.

In some embodiments, the overcoat 303 can have a thickness of not greater than 100. In some embodiments, the overcoat 303 can have a thickness of not greater 70 Å. In some embodiments, the overcoat 303 can have a thickness of not less than 10 Å. In some embodiments, the overcoat 303 can have a thickness of not less than 20 Å. In some embodiments, the inner layer 307 can have a thickness of not greater than 50 Å. In some embodiments, the inner layer 307 can have a thickness of not greater than 30 Å. In some embodiments, the inner layer 307 can have a thickness of not less than 10 Å. In some embodiments, the inner layer 307 can have a thickness of not less than 20 Å. In some embodiments, the outer layer 309 can have a thickness of not greater than 90 Å. In some embodiments, the outer layer 309 can have a thickness of not greater than 60 Å. In some embodiments, the outer layer 309 can have a thickness of not less than 10 Å. In some embodiments, the outer layer 309 can have a thickness of not less than 20 Å.

Figure 3B:
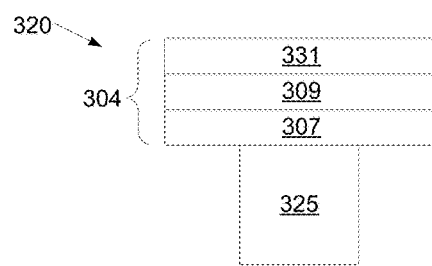

FIG. 3B depicts a similar device 320 that includes a NFT 325 and an overcoat 304. The overcoat depicted in FIG. 3B includes an inner layer 307, an outer layer 309 and an optional exterior layer 331. The inner layer 307 and the outer layer 309 may have properties and characteristics such as those discussed above with respect to FIG. 3A. The exterior layer 331 can include materials such as, for example carbon containing materials (such as diamond like carbon (DLC)), magnetic materials, molecular materials, and oxides such as tantalum oxide. Specific details regarding materials for the optional exterior layer can be found, for example in U.S. patent application Ser. No. 14/313,611 filed on Jun. 24, 2014, entitled "DEVICES INCLUDING A GAS BARRIER LAYER", the entire disclosure of which is incorporated herein by reference thereto.

Figure 3C:
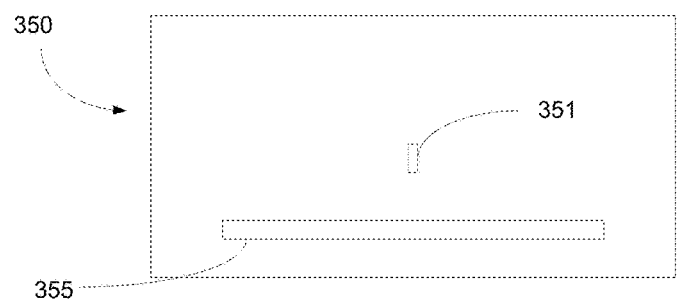

FIG. 3C depicts a view looking down at the air bearing surface (ABS) of a device 350. The device 350 can include a magnetic structure 355 and a magnetic writer 351. The magnetic writer 351 can have details such as those discussed above. The magnetic structure 355 can include a magnetic reader, a return pole, or some combination thereof. In some embodiments, the magnetic writer 351 can also include a NFT, such as those discussed above. The device also includes an overcoat. The overcoat is positioned over at least the NFT included in the magnetic writer. In some embodiments, the overcoat can be positioned over more than just the NFT of the magnetic writer (i.e., the entire magnetic writer, some portion of the magnetic reader, or both). The overcoat can be a continuous layer, or a non-continuous layer that is positioned over at least a portion of the NFT on the air bearing surface of the device. In some embodiments, disclosed overcoats are disposed on the entire magnetic writer structure (including the NFT), and at least some portion of the magnetic reader. In some embodiments, overcoats can also include regions that are continuous as well as non-continuous regions; such overcoats are described herein as non-continuous.

Layers disclosed herein, including inner layers, outer layers and optional exterior layers can be formed using known methods, including, for example physical vapor deposition (PVD), chemical vapor deposition (CVD), and atomic layer deposition (ALD). In some embodiments, inner layers, outer layers, optional exterior layers, or any combination thereof can be formed using ALD, for example. In some embodiments, at least some layers included in disclosed devices can have low optical absorption (e.g., k, 0.001). In some embodiments, at least the inner layer has a low optical absorption. In some embodiments, such low optical absorptive materials can be formed using physical vapor deposition (PVD), chemical vapor deposition (CVD), and/or atomic layer deposition (ALD). In some embodiments, outer layers formed using ALD are desirably dense and non-permeable.

Disclosed devices can offer advantageous properties, especially in the high temperature, high humidity, and highly oxidative environments of HAMR. Such devices may offer minimal optical absorption, low gas (e.g., $H_2O$, $O_2$, or both) permeability, and strong adhesion between the overcoat and the NFT. Such properties may offer extended lifetimes for HAMR drives during practical usage by diminishing the corrosive effects of the HAMR environment and decreasing the likelihood of NFT recession.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of magnetic devices including overcoats are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A magnetic device comprising:
   a near field transducer (NFT); and
   an overcoat positioned over at least a portion of the NFT, the overcoat comprising an inner layer in contact with the NFT and an outer layer in contact with the inner layer, wherein the inner layer comprises oxides of yttrium, oxides of scandium, oxides of lanthanoids, oxides of actionoids, oxides of zinc, or combinations thereof.

2. The magnetic device according to claim 1, wherein the inner layer comprises yttrium oxide ($Y_2O_3$), scandium oxide ($Sc_2O_3$), oxides of lanthanoids: lanthanum oxide ($La_2O_3$), cerium oxide ($Ce_2O_3$, or $CeO_2$), praseodymium oxide ($Pr_2O_3$), neodymium oxide ($Nd_2O_3$), promethium oxide ($Pm_2O_3$), samarium oxide ($Sm_2O_3$), europium oxide ($Eu_2O_3$), gadolinium oxide ($Gd_2O_3$), terbium oxide ($Tb_4O_7$, $Tb_2O_3$, $TbO_2$, or $Tb_6O_{11}$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and lutetium oxide ($Lu_2O_3$), oxides of actinoids: actinium oxide ($Ac_2O_3$), thorium oxide ($Th_2O_7$ or $THO_2$), protactinium oxide ($Pa_2O_5$, $PaO_2$, or $PaO$), uranium oxide ($U_3O_8$, $UO_2$, $UO_3$, $U_2O_5$, or $UO_4.2H_2O$), neptunium oxide ($NpO_2$, $Np_2O_5$, or $Np_5O_8$), plutonium oxide ($PuO_2$ or $PuO_4$), americium oxide (AmO, $Am_2O_3$, or $AmO_2$), curium oxide ($Cm_2O_3$, $CmO_2$, or $CmO_4$), berkelium oxide ($Bk_2O_3$, or $BkO_2$), californium oxide ($Cf_2O_3$ or $CfO_2$), einsteinium oxide ($Es_2O_3$), fermium oxide ($Fm_2O_3$, or FmO), mendelevium oxide ($Md_2O_3$ or MdO), nobelium oxide ($No_2O_3$ or NoO), and lawrencium oxide ($Lr_2O_3$), zinc oxide (ZnO), or combinations thereof.

3. The magnetic device according to claim 1, wherein the inner layer comprises yttrium oxide ($Y_2O_3$), scandium oxide ($Sc_2O_3$), or combinations thereof.

4. The magnetic device according to claim 1, wherein the inner layer comprises yttrium oxide ($Y_2O_3$).

5. The magnetic device according to claim 1, wherein the outer layer comprises aluminum oxide ($Al_2O_3$), silicon oxide ($SiO_2$), tantalum oxide ($Ta_2O_5$), hafnium oxide ($HfO_2$), or combinations thereof.

6. The magnetic device according to claim 1, wherein the outer layer comprises aluminum oxide ($Al_2O_3$), and silicon oxide ($SiO_2$).

7. The magnetic device according to claim 1, wherein the outer layer comprises a first layer in contact with the inner layer the first layer comprising aluminum oxide ($Al_2O_3$), and a second layer in contact with the first layer, the second layer comprising silicon oxide ($SiO_2$).

8. The magnetic device according to claim 1, wherein the overcoat has a thickness from about 5 A to about 100 A.

9. The magnetic device according to claim 1 further comprising an exterior layer in contact with the outer layer of the overcoat.

10. The magnetic device according to claim 9, the exterior layer comprising diamond like carbon (DLC).

11. A magnetic device comprising:
    a near field transducer (NFT); and
    an overcoat positioned over at least a portion of the NFT, the overcoat comprising:
    an inner layer in contact with the NFT, the inner layer comprising oxides of yttrium, oxides of scandium, oxides of lanthanoids, oxides of actionoids, oxides of zinc, or combinations thereof; and
    an outer layer in contact with the inner layer, the outer layer comprising aluminum oxide ($Al_2O_3$), silicon oxide ($SiO_2$), tantalum oxide ($Ta_2O_5$), hafnium oxide ($HfO_2$), or combinations thereof.

12. The magnetic device according to claim 11, wherein the inner layer comprises yttrium oxide ($Y_2O_3$), scandium oxide ($Sc_2O_3$), oxides of lanthanoids: lanthanum oxide ($La_2O_3$), cerium oxide ($Ce_2O_3$, or $CeO_2$), praseodymium oxide ($Pr_2O_3$), neodymium oxide ($Nd_2O_3$), promethium oxide ($Pm_2O_3$), samarium oxide ($Sm_2O_3$), europium oxide ($Eu_2O_3$), gadolinium oxide ($Gd_2O_3$), terbium oxide ($Tb_4O_7$, $Tb_2O_3$, $TbO_2$, or $Tb_6O_{11}$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and lutetium oxide ($Lu_2O_3$), oxides of actinoids: actinium oxide ($Ac_2O_3$), thorium oxide ($Th_2O_7$ or $THO_2$), protactinium oxide ($Pa_2O_5$, $PaO_2$, or $PaO$), uranium oxide ($U_3O_8$, $UO_2$, $UO_3$, $U_2O_5$, or $UO_4.2H_2O$), neptunium oxide ($NpO_2$, $Np_2O_5$, or $Np_5O_8$), plutonium oxide ($PuO_2$ or $PuO_4$), americium oxide (AmO, $Am_2O_3$, or $AmO_2$), curium oxide ($Cm_2O_3$, $CmO_2$, or $CmO_4$), berkelium oxide ($Bk_2O_3$, or $BkO_2$), californium oxide ($Cf_2O_3$ or $CfO_2$), einsteinium oxide ($Es_2O_3$), fermium oxide ($Fm_2O_3$, or FmO), mendelevium oxide ($Md_2O_3$ or MdO), nobelium oxide ($No_2O_3$ or NoO), and lawrencium oxide ($Lr_2O_3$), zinc oxide (ZnO), or combinations thereof.

13. The magnetic device according to claim 11, wherein the inner layer comprises yttrium oxide ($Y_2O_3$), scandium oxide ($Sc_2O_3$), or combinations thereof.

14. The magnetic device according to claim 11, wherein the inner layer comprises yttrium oxide ($Y_2O_3$).

15. The magnetic device according to claim 11, wherein the outer layer comprises aluminum oxide ($Al_2O_3$), and silicon oxide ($SiO_2$).

16. The magnetic device according to claim 11, wherein the outer layer comprises a first layer in contact with the inner layer the first layer comprising aluminum oxide ($Al_2O_3$), and a second layer in contact with the first layer, the second layer comprising silicon oxide ($SiO_2$).

17. The magnetic device according to claim 11, wherein the overcoat has a thickness from about 5 A to about 100 A.

18. The magnetic device according to claim 11 further comprising an exterior layer in contact with the outer layer of the overcoat, the exterior layer comprising diamond like carbon (DLC).

19. A magnetic device comprising:
    a magnetic writer, the magnetic writer comprising a near field transducer (NFT);
    a magnetic reader; and
    an overcoat positioned over at least the magnetic writer and the magnetic reader, the overcoat comprising:
    an inner layer in contact with the NFT, the inner layer comprising yttrium oxide, scandium, oxide, or combinations thereof; and an outer layer in contact with the inner layer, the outer layer comprising aluminum oxide ($Al_2O_3$), silicon oxide ($SiO_2$), tantalum oxide ($Ta_2O_5$), hafnium oxide ($HfO_2$), or combinations thereof.

20. The device according to claim 19, wherein the outer layer comprises a first layer in contact with the inner layer the first layer comprising aluminum oxide ($Al_2O_3$), and a second layer in contact with the first layer, the second layer comprising silicon oxide ($SiO_2$).

* * * * *